US008670718B2

(12) United States Patent  
Moorti et al.

(10) Patent No.: US 8,670,718 B2
(45) Date of Patent: Mar. 11, 2014

(54) METHOD AND SYSTEM FOR ANTENNA SELECTION DIVERSITY WITH BIASING

(71) Applicant: Broadcom Corporation, Irvine, CA (US)

(72) Inventors: Rajendra Tushar Moorti, Mountain View, CA (US); Min Chuin Hoo, Sunnyvale, CA (US); Jason Alexander Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/865,442

(22) Filed: Apr. 18, 2013

(65) Prior Publication Data

US 2013/0230087 A1 Sep. 5, 2013

Related U.S. Application Data

(63) Continuation of application No. 12/725,060, filed on Mar. 16, 2010, now Pat. No. 8,428,541, which is a continuation of application No. 10/810,186, filed on Mar. 26, 2004, now Pat. No. 7,680,455.

(60) Provisional application No. 60/547,366, filed on Feb. 24, 2004.

(51) Int. Cl.
H04B 15/00 (2006.01)
H04B 1/00 (2006.01)
H04B 1/10 (2006.01)

(52) U.S. Cl.
USPC .................................. 455/63.1; 455/296

(58) Field of Classification Search
USPC ............ 455/63.1, 266, 296, 132–135, 161.3, 455/272, 277.1, 277.2, 562.1
See application file for complete search history.

(56) References Cited

U.S. PATENT DOCUMENTS

| | | | |
|---|---|---|---|
| 5,465,410 A | 11/1995 | Hiben et al. | |
| 5,542,119 A | 7/1996 | Grube et al. | |
| 5,740,526 A | 4/1998 | Bonta et al. | |
| 7,253,779 B2 | 8/2007 | Greer et al. | |
| 7,280,842 B2 | 10/2007 | Smolyer et al. | |
| 7,324,783 B2 | 1/2008 | Anderson | |
| 7,680,455 B2* | 3/2010 | Moorti et al. | 455/63.1 |
| 2005/0186910 A1 | 8/2005 | Moorti et al. | |
| 2010/0173590 A1 | 7/2010 | Moorti et al. | |

* cited by examiner

Primary Examiner — Eugene Yen
(74) Attorney, Agent, or Firm — Thomas | Horstemeyer, LLP

(57) ABSTRACT

A signal quality metric is determined for each of multiple signal paths. Each of the signal paths corresponds to a respective antenna. The determined signal quality metric is modified for one or more signal paths. A subset of the signal paths is selected for receiving a signal based at least in part on the determined signal quality metrics. The selecting is biased based at least in part on the modified signal quality metrics.

20 Claims, 9 Drawing Sheets

METHOD AND SYSTEM FOR ANTENNA SELECTION DIVERSITY WITH BIASING

CROSS-REFERENCE TO RELATED APPLICATIONS/INCORPORATION BY REFERENCE

This application makes reference to, claims priority to, and claims the benefit of U.S. application Ser. No. 12/725,060 filed Mar. 16, 2010, which application makes reference to, claims priority to, and claims the benefit of U.S. application Ser. No. 10/810,186 filed Mar. 26, 2004, which application makes reference to, claims priority to, and claims the benefit of U.S. Provisional Application Ser. No. 60/547,366 filed Feb. 24, 2004 and entitled "Method and System for Antenna Selection Diversity and Dynamic Gain Control."

This application makes reference to:
U.S. Utility application Ser. No. 10/810,462 filed Mar. 26, 2004.
U.S. Utility application Ser. No. 10/810,433 filed Mar. 26, 2004.
U.S. Utility application Ser. No. 10/810,408 filed Mar. 26, 2004.

The above stated applications are hereby incorporated herein by reference in their entirety.

FIELD OF THE INVENTION

Certain embodiments of the invention relate to wireless communication. More specifically, certain embodiments of the invention relate to a method and system for antenna selection diversity with biasing.

BACKGROUND OF THE INVENTION

In a wireless communication system a data stream will most likely experience multiple reflections (multipath) while propagating between the transmitter and the receiver. Multipath fading implies that multiple copies of the transmitted signal follow different paths and reach the receiving antenna with different time delays. In such cases, the received signal strength at a given time is the result of destructive and constructive interference of the multiple paths arriving from different directions. Destructive interference may degrade the performance of the detector and, therefore, it may adversely affects the system capacity. However, by using multiple antennas at the receiver and with appropriate digital signal processing methods, a multipath may be exploited to enhance the performance and robustness of the receiver and to increase the reliability of the communications link. The receiving antennas may need to be spaced sufficiently far apart so that the signal each antenna sees may not be correlated with the signals seen by the other antennas. Selection diversity may be utilized in mitigating multipath fading.

The algorithm for selection diversity is based on selecting the best signal among all the signals detected at the receiver antennas. If $P_i$ denotes the power estimated at antenna i at the receiver, the selection diversity scheme may select antenna j as the receive antenna if $P_j > P_i$, $i \neq j$. Higher accuracy in estimating the powers $P_i$ may result in higher probability of the right receive antenna being selected, and in better performance of the selection diversity scheme. Factors that affect the accuracy of the power estimates $P_i$ may include the presence of impairments, such as noise, transients and offsets, for example.

Impairments, such as noise, transients and offsets, corrupt the power estimates $P_i$ and may result in misestimations of the power during an antenna selection process. Such misestimations of power may lead to the selection of antenna j, for example, as the receive antenna, even if $P_j < P_i$ for some other antenna i.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for choosing at least one signal path for an antenna system of a receiver, transmitter and/or a transceiver. Aspects of the method may include determining a signal quality metric for each of a plurality of signal paths and modifying the signal quality metric for each of the plurality of signal paths. At least one signal path may be selected based on at least one modified signal quality metric. At least one of the signal paths may be cycled through. The signal quality metric may be biased, increased by a fixed amount and/or by a predetermined amount and/or dynamically changed for each of the plurality of signal paths. The signal quality metric may be decreased for each of the plurality of signal paths by a fixed amount and/or a predetermined amount.

A signal path with a signal quality metric greater than at least one modified signal quality metric may be selected. A signal path with a signal quality metric less than at least one modified signal quality metric may be selected. The signal quality metric may include, but is not limited to, a power level characteristic, a packet error rate characteristic, a bit error rate characteristic, a propagation channel characteristic, and/or an interference level characteristic. One or more of the signal paths may comprise an antenna and each of the signal paths may include a receive signal path and/or a transmit signal path.

Another embodiment of the invention may provide a machine-readable storage, having stored thereon, a computer program having at least one code section executable by a machine, thereby causing the machine to perform the steps as described above for choosing at least one signal path.

Aspects of the system for choosing at least one signal path may include at least one processor that determines a signal quality metric for each of a plurality of signal paths. The at least one processor may modify the signal quality metric for each of the plurality of signal paths and may select at least one signal path based on at least one modified signal quality metric. The at least one processor may cycle through at least one of the signal paths and, and/or increase the signal quality metric for each of the plurality of signal paths by a fixed amount and/or by a predetermined amount. The at least one processor may dynamically change and/or decrease the signal quality metric for each of the plurality of signal paths by a fixed and/or a predetermined amount. The at least one processor may select a signal path with a signal quality metric greater than or less than at least one modified signal quality metric. The signal quality metric may include a power level characteristic, a packet error rate characteristic, a bit error rate characteristic, a propagation channel characteristic, and/or an interference level characteristic. One or more of the signal paths may comprise an antenna and each of the signal paths may include a receive signal path and/or a transmit signal path.

These and other advantages, aspects and novel features of the present invention, as well as details of an illustrated embodiment thereof, will be more fully understood from the following description and drawings.

DETAILED DESCRIPTION OF THE INVENTION

Figure 1A:
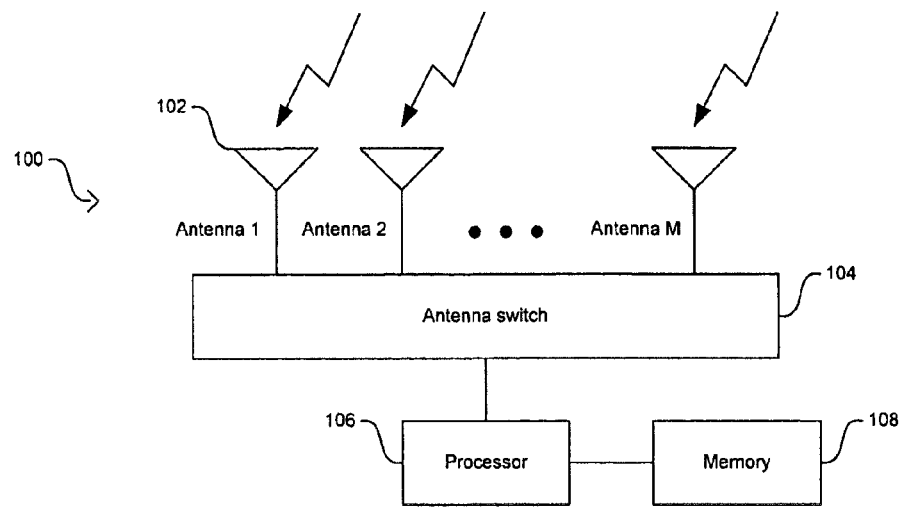
FIG. 1A is a diagram of an exemplary receiver system that may be utilized in connection with selection diversity with dynamic gain control, in accordance with an embodiment of the invention.

Certain aspects of the present invention may be found in a method and system for choosing at least one signal path. For each of a plurality of signal paths, a signal quality metric may be determined. The signal quality metric may be modified for each of the signal paths, and a signal path may be selected based on at least one modified signal quality metric. Signal paths may be cycled through and the signal quality metric may be biased for each of the signal paths. The signal quality metric may also be dynamically changed for each signal path, increased or decreased by a fixed amount and/or by a predetermined amount. A signal path with a signal quality metric greater than, or less than, a modified signal quality metric may be selected. The signal quality metric may include a power level characteristic, a packet error rate characteristic, a bit error rate characteristic, a propagation channel characteristic, and/or an interference level characteristic. One or more of the signal paths may comprise an antenna and each of the signal paths may include a receive signal path and/or a transmit signal path.

Certain other embodiments of the invention may also be found in a method and system for antenna selection diversity with dynamic gain control. Wireless communication systems may utilize receivers with multiple antennas to enhance the performance and robustness of the receiver and to increase the reliability of the communications link. Certain aspects of the method may comprise dwelling on at least one of several antennas in a receiver system in order to select a portion of those antennas for signal processing, determining a gain, and determining a signal quality metric for the dwelled-on antennas. The power may be an estimated received power or it may be a received power. Selecting the portion of antennas that may be used for signal processing may be based on the gain, the estimated signal quality metric, and/or the received signal quality metric of the dwelled-on antennas.

A starting antenna may be selected from the antennas in the receiver system based on a predetermined criteria, random selection, and/or on information of which dwelled-on antennas or portion of dwelled-on have been selected for signal processing in the past. A starting gain for the starting antenna may be determined by using an automatic gain control.

Other antennas in the receiver system may be selected for dwelling based on a predetermined criteria. For each of the dwelled-on antennas, a gain may be determined dynamically based on the gain, the signal quality metrics, and/or on at least one of the power coupling parameters that may be measured between the antenna switch outputs in the receiver. The signal quality metrics may be an estimated received power, a received power, a signal-to-noise ratio, a bit error rate, a packet error rate, a propagation channel characteristic, an/or a channel interference. Selecting a portion of the dwelled-on antennas for signal processing in the current information frame may be based on a comparison against a specified range of levels for at least one signal quality metric.

FIG. 1A is a diagram of an exemplary receiver system that may be utilized in connection with selection diversity with dynamic gain control, in accordance with an embodiment of the invention. Referring to FIG. 1A, the receiver system 100 may comprise at least one antenna 102, an antenna switch 104, a processor 106, and a memory 108. There may be as many as M antennas 102 coupled to the antenna switch 104. The antenna 102 may be part of an independent antenna array of antennas coupled to the antenna switch 104, may be one of several individual antennas coupled to the antenna switch 104, and/or may be one of several integrated individual antennas and/or may be part of an integrated array of antennas coupled to the antenna switch 104. The antenna switch 104 may be a mechanical, electronic, electromechanical, and/or microelectromechanical (MEM) switch. The processor 102 may be a hardware resource, a core processor, a coprocessor, a digital signal processor, or a microcontroller. The memory 108 may be an external memory, an embedded memory, a shared memory, or a main memory. The memory 108 may be an SRAM and/or DRAM type memory.

The incoming wireless signal may be received by at least one antenna 102. The antenna switch 104 may select the antenna channel of any antenna 102. The processor 106 may notify the antenna switch 104 which antenna channel corresponding to a particular antenna 102 to select. The processor 106 may be utilized to determine which antenna 102 may be the starting antenna, to determine which antenna 102 to select next, to determine the dwell time in each selected antenna, to detect and decode the incoming signal, and to amplify or apply a gain to the signal. The processor 106 may apply gain to the signal from an antenna channel by utilizing an automatic gain control (AGC) or by determining a specific gain to apply. The processor 106 may be utilized to determine the estimated power of the signal, to determine a signal-to-noise ratio, to determine a packet-error-rate or bit-error-rate, to transfer information to and from memory 108, and to determine statistics based on information from several transmitted frames stored in memory 108. The memory 108 may be utilized to store information processed by the processor 106 that may be associated with any antenna 102 in any number of transmitted frames.

In operation, the processor 106 may notify the antenna switch 104 which antenna 102 may be used as the starting antenna. The processor 106 may determine which antenna 102 to use for the starting antenna based on information from preceding frames that may be stored in memory 108. The antenna switch 104 may select the antenna channel that corresponds to the selected antenna 102. The processor 106 may dwell on the starting antenna until it detects an incoming signal. Once the signal is detected, an AGC may be applied to obtain a sufficiently strong signal for decoding. The processor 106 may determine the estimated received power for the starting antenna and may store the value in memory 108. The processor 106 may then notify the antenna switch 104 to select the next antenna 102 for detection. The processor 106 may determine which antenna 102 to use as the next antenna based on information from preceding frames that may be stored in memory 108. The antenna switch 104 may select the antenna channel that corresponds to the next antenna. The processor 106 may dwell on the next antenna and apply a predetermined gain because the dwell time may be insufficient for an AGC to run its full operation. The processor 106 may determine the estimated received power for the next antenna and may store the value in memory 108. A similar procedure may be carried out with the remaining antennas in receiver system 100. With the exception of the starting antenna, a predetermined gain may be applied to all the other antennas because dwell time in all but the starting antenna is limited. The processor 106 may determine an estimated received power for all antennas in receiver system 100 and store the values in memory 108. The processor 106 may select the best antenna for decoding by selecting the highest estimated received power to determine the antenna 102 which has the strongest signal. The processor 106 may then notify the antenna switch 104 to select the antenna channel that corresponds to the antenna 102 with the strongest signal for decoding. The processor 106 may then detect and decode the signal from the selected best antenna and may store information associated with the antenna 102 it selected as the best antenna for the current frame.

Figure 1B:
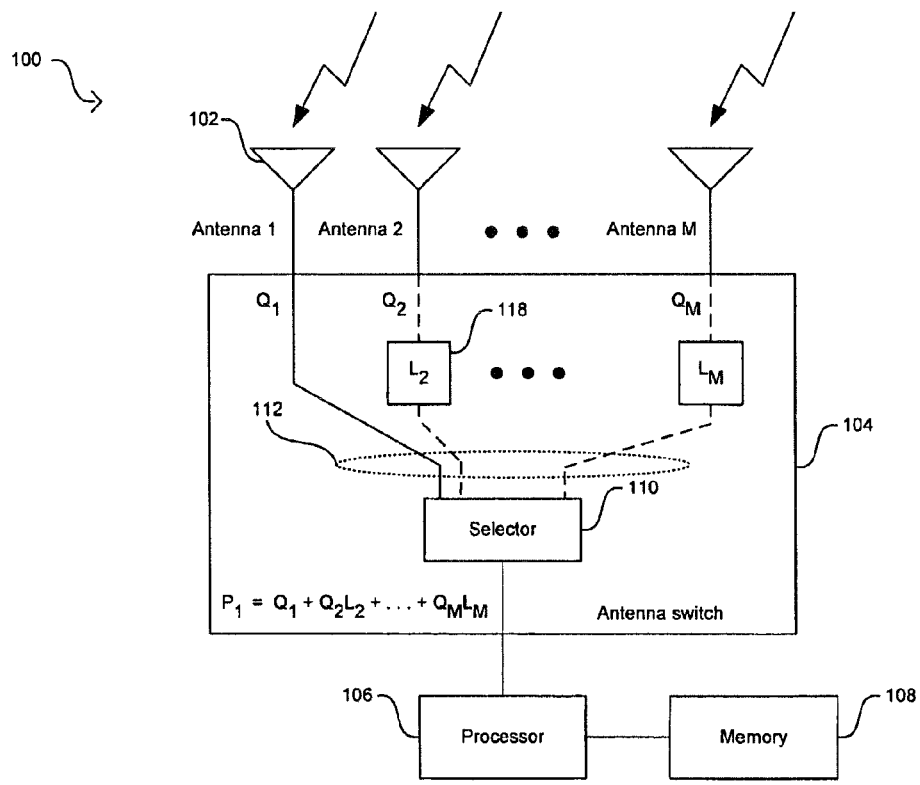
FIG. 1B is a diagram of an exemplary antenna switch in a receiver system that may be utilized with selection diversity with dynamic gain control, in accordance with an embodiment of the invention.

FIG. 1B is a diagram of an exemplary antenna switch in a receiver system that may be utilized with selection diversity with dynamic gain control, in accordance with an embodiment of the invention. Referring to FIG. 1B, in this exemplary diagram, the selector 110 in antenna switch 104 may be configured to connect antenna 1 to processor 106. In this case, the incident power $Q_1$ in antenna 1 is received by processor 106. Moreover, because the isolation between antenna channels 112 in antenna switch 104 is not perfect, in this configuration the processor 106 may also receive, when detecting a signal in antenna 1, part of the incident powers $Q_2$ through $Q_M$ received by antennas 2 through M. The amount of each incident power $Q_2$ through $Q_M$ from antennas 2 through M received by processor 106 when detecting a signal in antenna 1 may be attenuated by power coupling factors 118 $L_2$ through $L_M$. The factors $L_2$ through $L_M$ correspond to the proportion of the incident powers received by antennas 2 through M that will show in the antenna channel 112 of antenna 1 because of the imperfect isolation in antenna switch 104. The total estimated power received by processor 106 from antenna 1 is $P_1 = Q_1 + Q_2 L_2 + \ldots + Q_M L_M$.

For illustration, when $Q_1 \ll Q_i L_i$, $i \neq 1$ and that $Q_2 L_2$ is dominant, the estimated received power received by processor 106 may reduced to $P_1 = Q_2 L_2$. In this case, a maximum power of interest at antenna 2 may be given by $P_1/L_2$, which is the estimated received power of antenna 1 divided by a measured power coupled factor between antennas 1 and 2. Therefore, the gain setting found for antenna 1 by the AGC through a long dwell time may be backed-off for use in antenna 2 to allow for a signal whose power is as large as $P_1/L_2$ to be detected properly at antenna 2. The gain for antenna 2 may not need to be predetermined but may be dynamically adjusted in each received frame. Repeating the same exercise for cases where $Q_3 L_3, \ldots,$ or $Q_M L_M$ dominates, the maximum power of interest is $P_1/L_j$, where $L_j = \max(L_i, i \neq 1)$ is the power coupling factor 118 for antenna j. Since $L_j$ is known, backing-off the gain setting found for antenna 1 to allow for $P_1/L_j$ to be detected properly at antenna j may also allow for $P_1/L_i$, $i \neq j, 1$ to be detected properly at antenna i. The gain setting for all antennas other than the starting antenna may be dynamically set as it is backed-off from the gain setting found for antenna 1. If there is sufficient time, the gain back-off may be implemented in more than one step. In this regard, a time required to finish dynamic gain control is much less than a time required to run a full automatic gain control (AGC) on each of the antenna channels in receiver system 100.

Figure 2A:
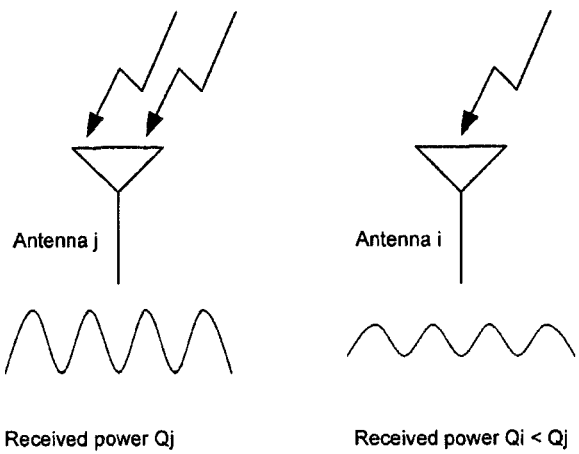
FIG. 2A illustrates exemplary received powers by different antennas in a receiver system, in accordance with an embodiment of the invention.

FIG. 2A illustrates exemplary received powers by different antennas in a receiver system, in accordance with an embodiment of the invention. Referring to FIG. 2A, in this exemplary illustration the receiver system 100 may be a two antenna system comprising antenna j and antenna i. The receiver system 100 may determine whether antenna j or antenna i may be selected as the best antenna for decoding the incoming frame or packet information. Antenna j receives a stronger received power than antenna i ($Q_i < Q_j$) and therefore receiver system 100 should select antenna j for signal decoding.

Figure 2B:
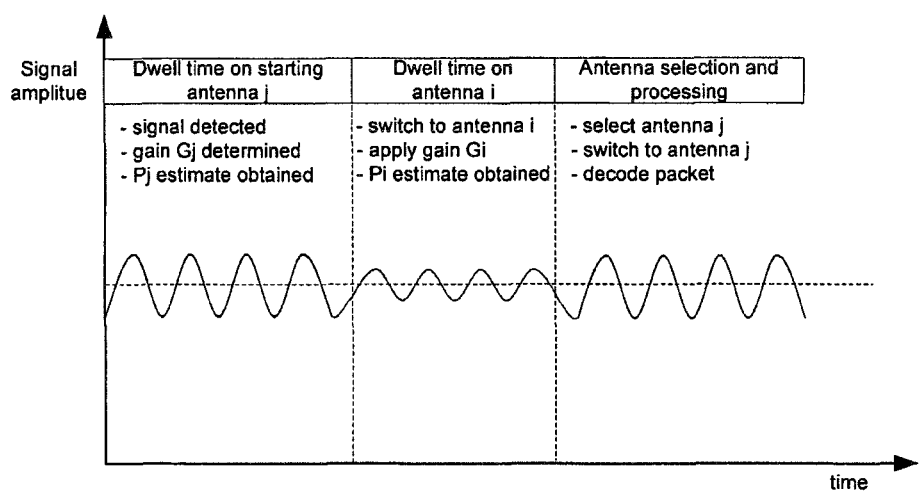
FIG. 2B illustrates exemplary antenna dwell times, signal gain, and antenna selection in a receiver system in connection with selection diversity with dynamic gain control, in accordance with an embodiment of the invention.

FIG. 2B illustrates exemplary antenna dwell times, signal gain, and antenna selection in a receiver system in connection with selection diversity with dynamic gain control, in accordance with an embodiment of the invention. Referring to FIG. 2B, the receiver system 100, in determining whether it should select antenna j or antenna i in FIG. 2A for signal decoding, may first dwell on antenna j, if antenna j was selected as the starting antenna. Once the signal is detected, the gain $G_j$ may be determined for antenna j. The processor 106 may determine an estimated received power $P_j$ for antenna j. The processor 106 may then dwell on antenna i by notifying the antenna switch 104 to select antenna i for detection. The gain $G_i$ for antenna i may be set to correspond to the gain $G_j$ or lower for antenna j or to a predetermined value. In that case, the processor 106 may determine an estimated received power for antenna i that may be lower than the estimated received power for antenna j. After dwelling on both antenna j and antenna i, the processor 102 may correctly select antenna j as the one with the strongest signal, notify the antenna switch 104 to select antenna j, and use the signal from antenna j for decoding the packet being received in the current information frame. As long as the antenna with the strongest signal is the same as the antenna that the receiver system 100 selects as the starting antenna, setting the gain of all following antennas to correspond to the gain of the first antenna may result in the correct antenna selection.

Figure 3A:
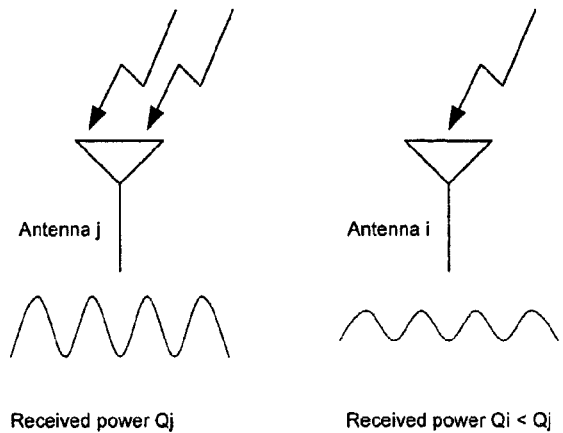
FIG. 3A illustrates exemplary received powers by different antennas in a receiver system, in accordance with an embodiment of the invention.

FIG. 3A illustrates exemplary received powers by different antennas in a receiver system, in accordance with an embodiment of the invention. Referring to FIG. 3A, in this exemplary illustration the receiver system 100 may be a two antenna system comprising antenna j and antenna i. The receiver system 100 may determine whether antenna j or antenna i may be selected as the best antenna for decoding the incoming frame or packet information. Antenna j receives a stronger received power than antenna i ($Q_i < Q_j$) and therefore receiver system 100 should select antenna j for signal decoding.

Figure 3B:
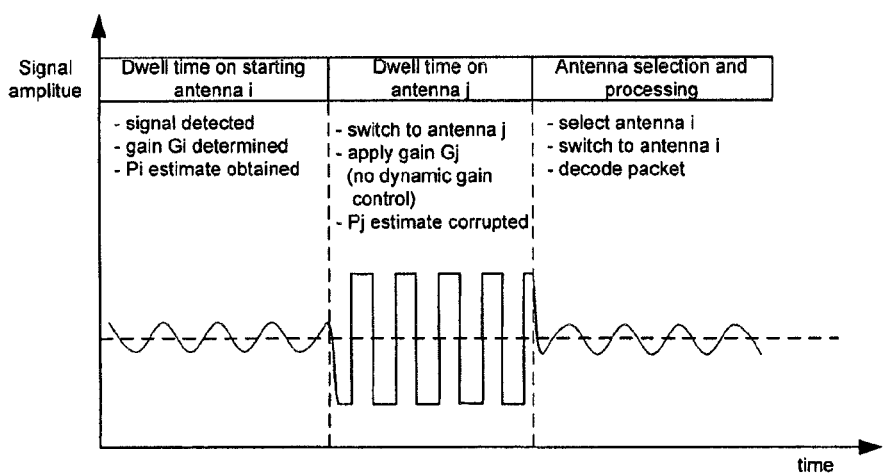
FIG. 3B illustrates exemplary antenna dwell times, signal clipping, and antenna selection in a receiver system in connection with selection diversity with dynamic gain control, in accordance with an embodiment of the invention.

FIG. 3B illustrates exemplary antenna dwell times, signal clipping, and antenna selection in a receiver system in connection with selection diversity with dynamic gain control, in accordance with an embodiment of the invention. Referring to FIG. 3B, the receiver system 100, in determining whether it should select antenna j or antenna i in FIG. 3A for signal decoding, may first dwell on antenna i, if antenna i was selected as the starting antenna. Once the signal is detected, the gain $G_i$ may be determined for antenna i. The processor 106 may determine an estimated received power $P_i$ for antenna i. The processor 106 may then dwell on antenna j by notifying the antenna switch 104 to select antenna j for detection. The gain $G_i$ for antenna j may be set to correspond to the gain $G_i$ for antenna i or to a predetermined value. Such case may occur, for example, if dynamic gain adjustment only uses the gain of antenna i and does not use other signal quality metrics in setting the gain in antenna j. Because the signal in antenna i may be weaker than that in antenna j, if the gain $G_i$ for antenna j is set to correspond to the gain $G_i$ or larger, the signal in antenna j may be clipped and processor 106 may not be able to accurately determine the estimated received power $P_j$ for antenna j. The processor 106 may drop antenna j because it could not determine its estimated received power and may select antenna i for signal decoding. By setting the gain in all following antennas after the starting antenna to correspond to a reduced portion of the gain of the starting antenna, the receiver system 100 may avoid signal saturation and be able to select the correct antenna for signal decoding.

Figure 3C:
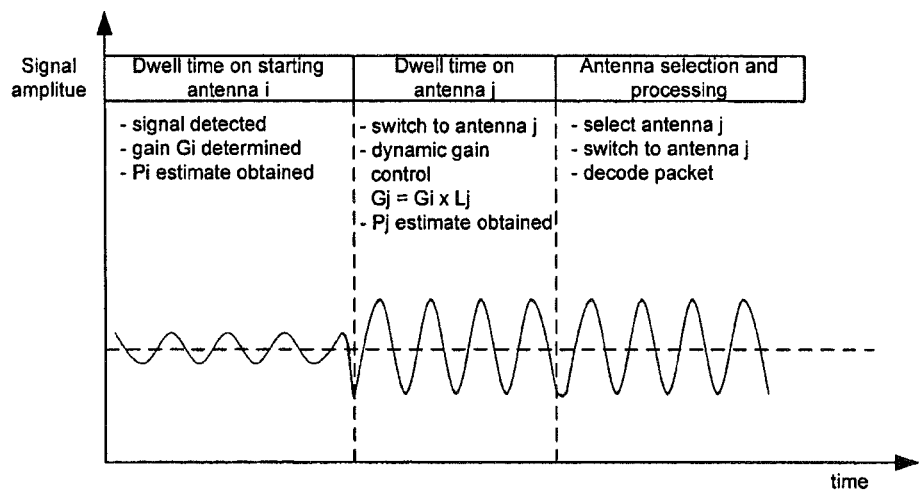
FIG. 3C illustrates exemplary antenna dwell times, dynamic gain control, and antenna selection, in accordance with an embodiment of the invention.

FIG. 3C illustrates exemplary antenna dwell times, dynamic gain control, and antenna selection, in accordance with an embodiment of the invention. Referring to FIG. 3C, the receiver system may dynamically control the gain $G_j$ to be applied to antenna j by applying a gain $G_i L_j$, where $L_j$ is the power coupling factor between antenna j and antenna i. The coupling power factor $L_j$ may be used to reduce the gain and to guarantee that signal saturation may not result in the incorrect selection of the best antenna for signal decoding. Because the coupling power factors 118 may be known from the antenna switch 104 specification or may be measured prior to the operation of receiver system 100, they may be stored in memory 108 and may be used by the processor 106 to dynamically control the gain in all following antennas after the starting antenna. The processor 106 may apply a gain $G_s L_j$, where $G_s$ corresponds to the gain of the starting antenna, whichever one may be selected as the starting antenna by processor 106, and $L_j$ corresponds to the power coupling factor between the current dwelling antenna j and the starting antenna. When the processor dwells on a following antenna k, and the estimated received power of antenna k corresponds to the strongest signal, the processor 106 may select antenna k as the best antenna and may apply a gain $G_k L_i$ to antenna i, where $G_k$ corresponds to the gain of antenna k and $L_i$ corresponds to the power coupling factor between the current dwelling antenna i and the best antenna or antenna k.

Figure 4A:
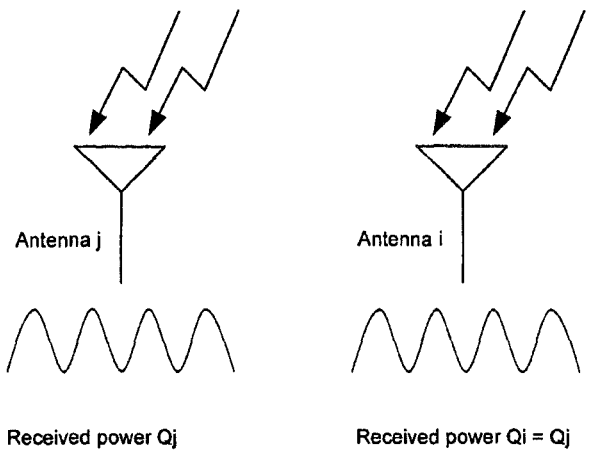
FIG. 4A illustrates exemplary received powers by different antennas in a receiver system, in accordance with an embodiment of the invention.

FIG. 4A illustrates exemplary received powers by different antennas in a receiver system, in accordance with an embodiment of the invention. Referring to FIG. 4A, in this exemplary illustration the receiver system 100 may be a two antenna system comprising antenna j and antenna i. The receiver system 100 may determine whether antenna j or antenna i may be selected as the best antenna for decoding the incoming frame or packet information. Antenna j and antenna i receive the same incoming power ($Q_i = Q_j$) and therefore receiver system 100 may select either antenna j or antenna i for signal decoding.

Figure 4B:
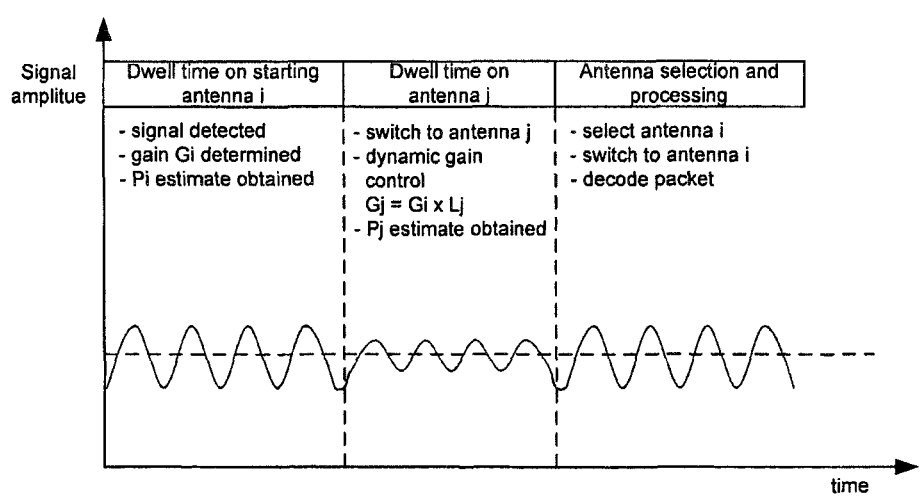
FIG. 4B illustrates exemplary antenna dwell times, dynamic gain control, and antenna selection, in accordance with an embodiment of the invention.

FIG. 4B illustrates exemplary antenna dwell times, dynamic gain control, and antenna selection, in accordance with an embodiment of the invention. Referring to FIG. 4B, the receiver system 100, in determining whether it should select antenna j or antenna i in FIG. 4A for signal decoding, may first dwell on antenna i, if antenna i was selected as the starting antenna. Once the signal is detected, an AGC is applied to antenna i to determine the gain $G_i$ for antenna i. The processor 106 may determine an estimated received power $P_i$ for antenna i after the AGC has settled. The processor 106 may then dwell on antenna j by notifying the antenna switch 104 to select antenna j for detection. The gain $G_j$ for antenna j may be set by processor 106 to correspond to $G_i L_j$, where $G_i$ corresponds to the gain of antenna i and $L_j$ corresponds to the power coupling factor between antenna j and antenna i. While the processor 106 may compensates for the lower applied gain in antenna j and may determine that the received power is the same in both antenna j and antenna i, the processor 106 may select antenna i over antenna j in this case because antenna j may be more susceptible than antenna i to transients signals, to capacitative or inductive coupling, and/or to other noise sources. Because the starting antenna may generally have longer dwelling times and an AGC may be used, the starting antenna may, in general, be less susceptible than other antennas to transients signals, to capacitative or inductive coupling, and/or to other noise sources.

Figure 5:
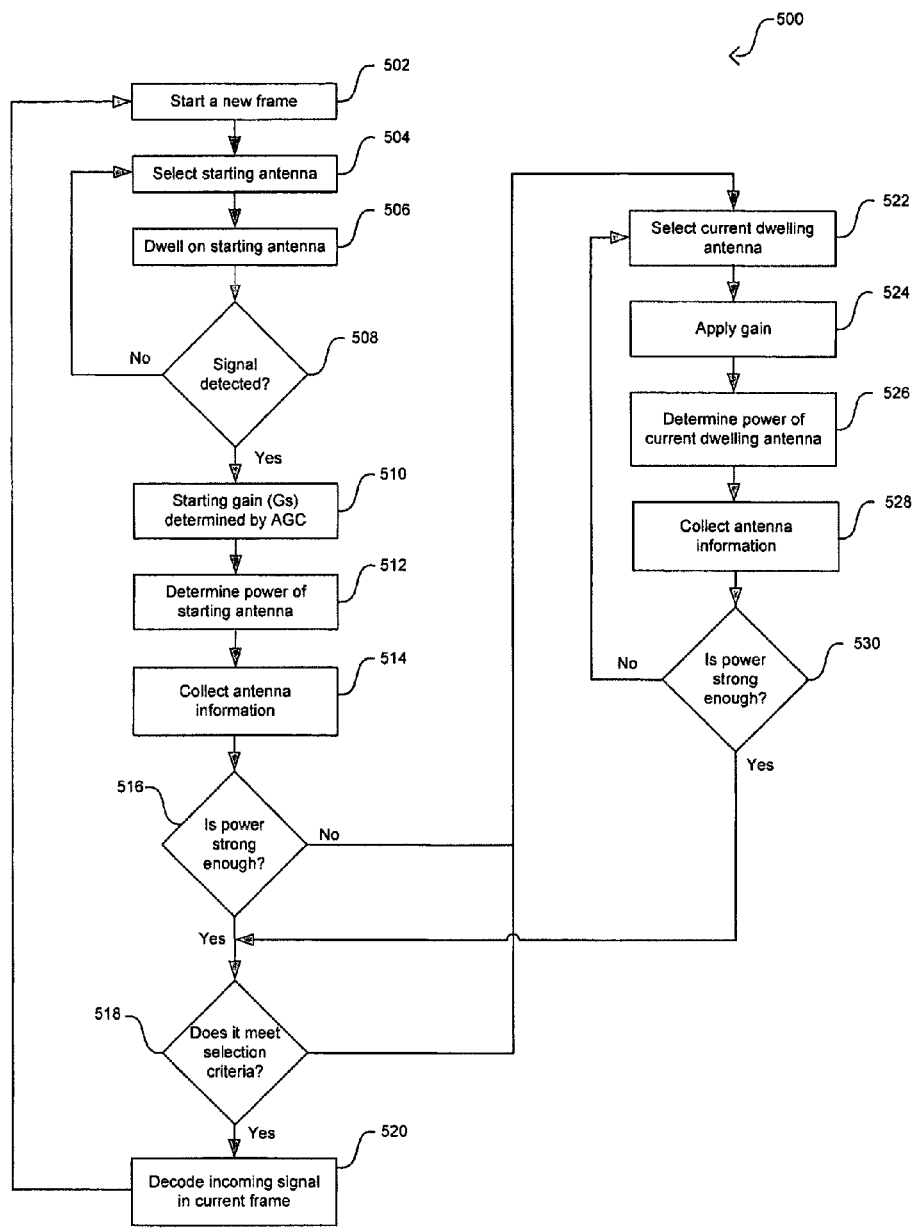
FIG. 5 is a flow chart illustrating exemplary steps that may be utilized in a receiver system for antenna selection with dynamic gain control, in accordance with an embodiment of the invention.

FIG. 5 is a flow chart illustrating exemplary steps that may be utilized in a receiver system for antenna selection with dynamic gain control, in accordance with an embodiment of the invention. Referring to FIG. 5, the receiver system 100 may start receiving a new frame in step 502. The processor 106 may select in step 504 the starting antenna based on a predetermined criteria, based on a random selection, and/or based on history of prior antenna selection. The starting antenna may be selected based on a different selection criterion from frame-to-frame. In step 506, the processor 106 may dwell on the starting antenna for a predetermined amount of time or until an event may indicate completion of dwelling in that starting antenna. In step 508, the processor 106 may determine whether the desired signal has been detected in the starting antenna. If the signal has not been detected after a certain amount of time, or under other performance criteria, the processor 106 may select a different starting antenna and return to step 504. If the signal has been detected within predefined performance constraints, the processor 106 may proceed to step 510. In step 510, the gain $G_s$ of the starting antenna may be determined by AGC or by the processor 106. In step 512, the processor 106 may determine the estimated received power of the starting antenna or it may determine the received power of the starting antenna. In step 514, the processor 106 may collect information on the gain $G_s$ of the starting antenna, the estimated power of the starting antenna, and/or the received power of the starting antenna, and store it in memory 108.

In step 516, the processor 106 may determine whether the signal quality metric at the starting antenna is strong enough. The signal quality metric may refer to the received power, Q, or to the estimated received power, P. To determine whether the signal quality metric is strong enough, the processor may compare the signal quality metric from step 512 to a threshold level. For example, if the signal in the starting antenna is at least 40 dB above noise, then the signal may be strong enough for detection and decoding. If the signal quality metric is determined to be adequate, then the processor 106 may proceed to step 518. In step 518, the processor 106 may determine if the signal quality metric in the starting antenna meets a selection criteria so that the starting antenna may be selected as at least one of the antennas that may be used for signal detection and signal decoding. The selection criteria may depend, for example, on the gain setting for the antenna, on the location of the antenna, on the number of antennas that may be selected, on the number or antennas that may have been dwelled on thus far, on the history of prior antenna selection, on the history of prior collected antenna information, and/or on an optimal amount of time that the receiver system 100 to detect and decode an antenna signal. If the antenna meets the selection criteria, the processor 106 may proceed to step 520 and decode the incoming signal from the selected antenna in the current frame. After decoding, the processor 106 may proceed back to step 502 and start a new information frame.

If in step 516 the signal quality metric in the starting antenna was not adequate to meet or exceed the threshold level, the processor 106 may proceed to step 522 where it may select a current dwelling antenna based on prior antenna selection history, based on a random selection, and/or based on a predetermined dwelling schedule. The processor 106 may apply a gain to the current dwelling antenna in step 524. The gain may depend on the collected gain, collected power information, and/or on the power coupling factors of all antennas dwelled on by the processor 106 thus far. In the case where the only antenna dwelled on is the starting antenna, the gain in step 524 may depend on the collected gain, collected power information in step 514 and/or on the power coupling factor between the current dwelling antenna and the starting antenna. For example, the gain setting may be $G_s L_d$, where $L_d$ corresponds to the coupling factor between the current dwelling antenna and the starting antenna. In step 526, the processor 106 may determine the signal quality metric of the current dwelling antenna. The signal quality metric may correspond to the estimated received power, P, or the received power, Q, of the current dwelling antenna. In step 528, the processor 106 may collect the antenna performance information and store it in memory 108.

In step 530, the processor 106 may determine whether the signal quality metric of the current dwelling antenna is adequate. The signal quality metric may refer to the received power, Q, or to the estimated received power, P. To determine whether the signal quality metric is adequate, the processor may compare the signal quality metric from step 526 to a threshold level. The threshold level in step 530 may be the same as the threshold level in step 516 or may be different. If the signal quality metric is not adequate, the processor 106 may return to step 522 and select a different current dwelling antenna from the remaining antennas in the receiver system 100. If the signal quality metric is adequate, the processor 106 may proceed to step 518 and determine whether the antenna performance meets or exceeds a specified selection criteria. If the current dwelling antenna meets or exceeds the selection criteria in step 520, then the processor 106 may proceed to step 520 and then to a new frame in step 502.

In one aspect of the present invention, carrier detection and full automatic gain control (AGC) may be performed on a starting antenna, whereas only dynamic gain control may be performed while dwelling on the second and subsequent antennas. Accordingly, the signal received on the starting antenna may first be verified as a valid frame before its power is estimated. However, for any of the remaining antennas, time constraints may only permit power estimation and no carrier detection. Furthermore, noise, signal transients, and offsets may corrupt the power estimates and may lead to an increase in the probability of selecting the wrong antenna as the receive antenna, especially in cases where the received signal powers of all antennas are similar. For example, antenna selection without biasing may be accomplished by selecting an antenna with a highest power estimate. However, the power may be misestimated. Even though a signal may be coming in at a given actual power, an impaired version may be received by an antenna and a misestimated total power may be obtained. As a result, during antenna selection, instead of obtaining actual receive powers $Q_i$ for an antenna i, an estimated power $P_i$ may be obtained, where $P_i$ may include impairments so that $P_i$ is higher or lower than the actual receive power $Q_i$.

Figure 6:
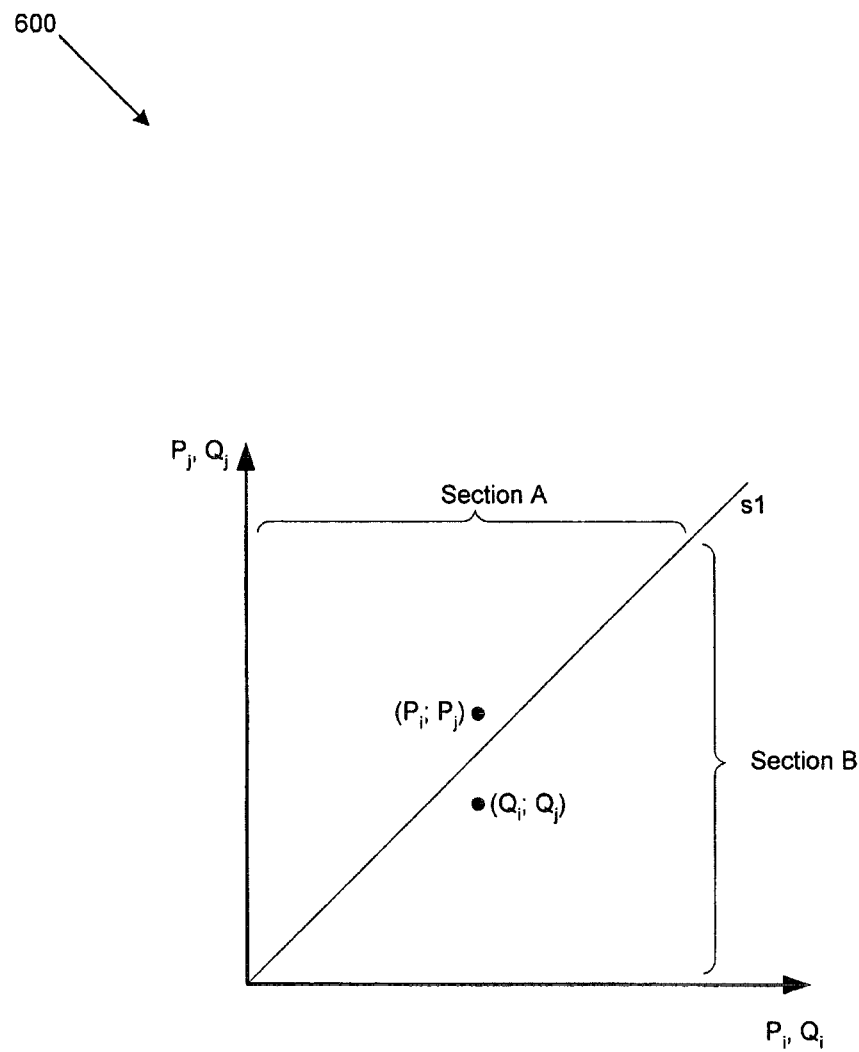
FIG. 6 is a graphical depiction of antenna selection without a bias, which may be utilized in connection with an embodiment of the invention.

FIG. 6 is a graphical depiction of antenna selection without a bias, which may be utilized in connection with an embodiment of the invention. Referring now to FIG. 6, the graphical depiction 600 illustrates the actual receive powers $Q_i$ and the estimated power $P_i$ for antenna i on the x-axis, and actual receive power Qj and estimated power Pj for antenna j on the y-axis. The 45-degree line s1 divides the quadrant in the graphical depiction 600 into two equal sections, namely section A and section B, respectively.

Antenna selection for the antennas i and j may be accomplished by comparing their estimated powers $P_i$ and $P_j$, respectively. If the estimated power values for antennas i and j are located below line s1 and in section B, this may indicate that the estimated power for antenna i is bigger than the estimated power for antenna j. Therefore, antenna i may be selected in an antenna selection process. If on the other hand the estimated power values for antennas i and j are located above line s1 and in section A, this may indicate that the estimated power for antenna j is bigger than the estimated power for antenna i. Therefore, antenna j may be selected in an antenna selection process.

The actual receive powers $Q_i$ and $Q_j$ for antennas i and j, however, may be different from the respective estimated power values $P_i$ and $P_j$. For example, the graphical depiction 600 illustrates the estimated power values ($P_i$; $P_i$) and the actual receive power values ($Q_i$; $Q_i$) where ($P_i$; $P_i$) is in section A and ($Q_i Q_j$) is in section B. In this case, $Q_i$ is larger than $Q_j$. However, because of mis-estimations due to noise, for example, the estimated power value $P_i$ is smaller than $P_j$. As a result, the antenna j may be incorrectly selected over antenna i, even though antenna i may have a higher power.

To prevent corrupted power estimates from causing selection of an incorrect antenna, the antenna selection may be biased towards a target antenna, for example. Biasing an antenna selection may safeguard against selecting the wrong antenna for signal processing in the presence of noise, transients, and offsets when all the power estimates are similar.

In another aspect of the present invention, antenna selection diversity may be accomplished with dynamic gain control. After a starting antenna is selected, it may be biased by shifting the selection region by X units, for example. In this way, a new second antenna may be selected as a target antenna only if the estimated power of the second antenna is greater than the power of the first selected antenna plus the bias X units. For example, there may be automatic gain control and carrier determination for a first antenna. For any subsequent antennas, the respective power values may be misestimated because of transients and/or noise, for example. In order for any subsequent antenna to be selected for receiving data, it may not be enough that the estimated power of the subsequent antenna is larger than the estimated power of the first antenna. By adding X units, the estimated power for a subsequent antenna may be required to exceed the estimated power of the first antenna and the added bias X, in order for the second antenna to be selected.

Figure 7:
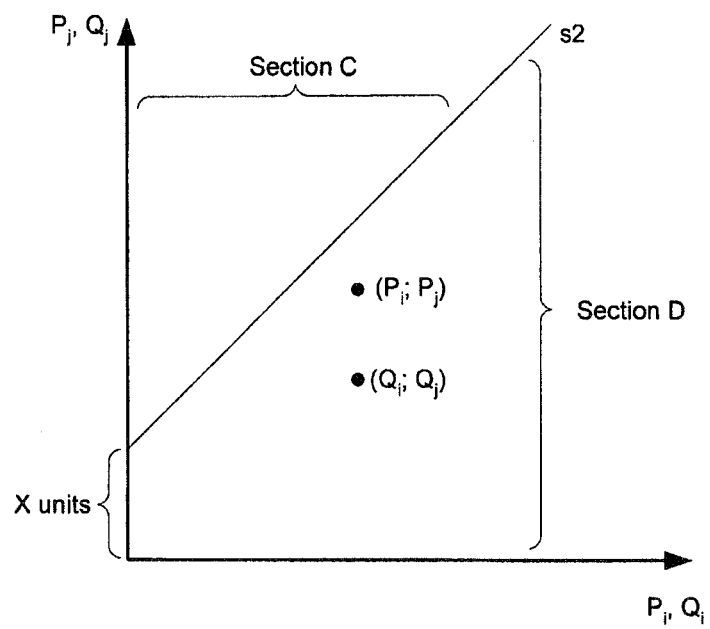
FIG. 7 is a graphical depiction of antenna selection with bias, in accordance with an embodiment of the invention.

FIG. 7 is a graphical depiction of antenna selection with a bias, in accordance with an embodiment of the present invention. Referring now to FIG. 7, the graphical depiction 700 illustrates the actual receive powers Q, and the estimated power $P_i$ for antenna i on the x axis, and actual receive power Qj and estimated power Pj for antenna j on the y axis. The 45-degree line s2 divides the quadrant in the graphical depiction 700 into two sections, section C and section D, respectively. In order to accomplish biasing of an antenna selection, the dividing line s2 may be shifted or changed in angle or shape in comparison to line s1 in order to account for a certain amount of bias. For example, antenna i may be biased by shifting the line s2 upwards, and antenna j may be biased by shifting the line s2 to the right. The change in shape, angle or location of line s2 may be represented as a modification to, or biasing of, the signal quality estimates.

Antenna selection for the antennas i and j may be accomplished by comparing their estimated powers $P_i$ and $P_j$, respectively. If the estimated power values for antennas i and j are located below line s2 and in section D, this may indicate that the modified estimated power for antenna i is bigger than the modified estimated power for antenna j. Therefore, antenna i may be selected in an antenna selection process. If on the other hand the estimated power values for antennas i and j are located above line s2 and in section C, this may indicate that the estimated power for antenna j is bigger than the estimated power for antenna i. Therefore, antenna j may be selected in an antenna selection process.

The graphical depiction 700 illustrates a bias of X units towards antenna i, since the line s2 is shifted upwards by X units. Antenna i may be initially selected as a target antenna, for example by utilizing antenna selection diversity with automatic gain control. By biasing antenna i by X units, the actual receive power values ($Q_i$; $Q_j$) and the estimated power values ($P_i$; $P_j$) may all be located in the same section D. In this way, antenna i may be selected even though antenna j may be misestimated with higher power.

In one aspect of the invention, the following equation may be utilized to determine whether a biased antenna i may remain as a selected antenna:

$$P_{i,dB} + X_{dB} > \max_{j \neq 1}(P_{j,dB})$$

Antenna i may be selected as the target antenna from a group of antennas, unless there is at least one other antenna j, whose power $P_j$ is at least X dB greater than that of antenna i. In another aspect of the present invention, a setting of X dB=0 may turn off the biasing towards antenna i and a setting of X dB<0 may bias away from antenna i.

In another aspect of the invention, the bias value of X dB may be selected dynamically or as a fixed value, depending on an expected amount of noise, for example. For weak signals, for example, misestimating errors may be in the order of 1 dB. In this case, the biasing value X may be selected larger than 1 dB. The bias value X may be dynamically changed, if the error margin in estimated power signals is monitored.

Figure 8:
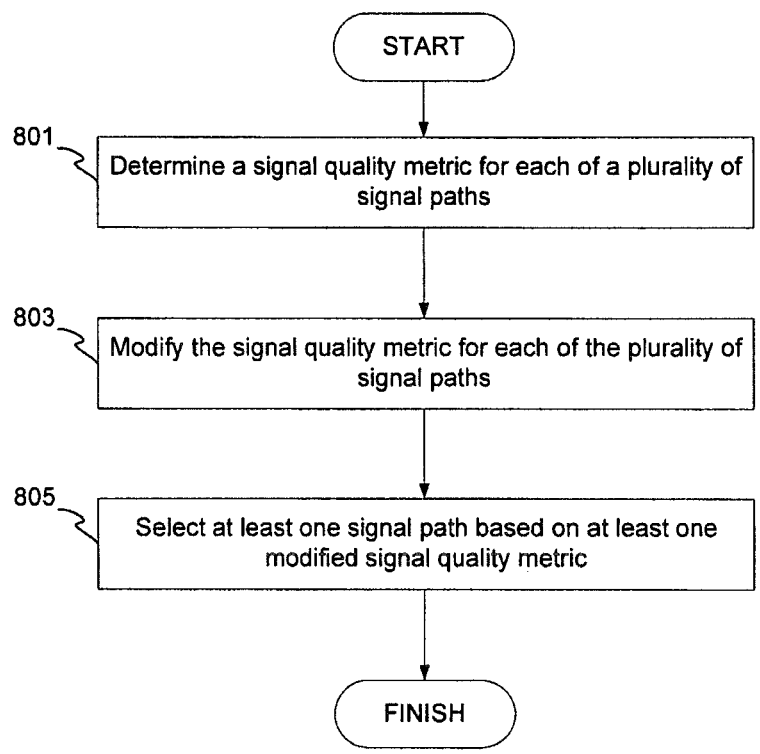
FIG. 8 is a flow diagram of an exemplary method for selecting a signal path, in accordance with an embodiment of the invention.

FIG. 8 is a flow diagram of an exemplary method 800 for selecting a signal path, in accordance with an embodiment of the invention. Referring to FIG. 8, at 801, a signal quality metric may be determined for each of a plurality of signal paths. At 803, the signal quality metric for each of the plurality of signal paths may be modified. At 805, at least one signal path may be selected based on one or more modified signal quality metric.

Accordingly, the invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   determining a signal quality metric for each of a plurality of signal paths, each of the plurality of signal paths corresponding to a respective one of a plurality of antennas;
   modifying the determined signal quality metric for one of the plurality of signal paths; and
   selecting a subset of the plurality of signal paths for receiving a signal based at least in part on the determined signal quality metrics, the selecting being biased based at least in part on the modified signal quality metric.

2. The method of claim 1, wherein the signal quality metric comprises a signal-to-interference ratio.

3. The method of claim 1, wherein the signal quality metric comprises a power level characteristic.

4. The method of claim 1, wherein the signal quality metric comprises a packet error rate characteristic.

5. The method of claim 1, wherein the signal quality metric comprises a bit error rate characteristic.

6. The method of claim 1, wherein the signal quality metric comprises a propagation channel characteristic.

7. The method of claim 1, further comprising cycling through at least one of the plurality of signal paths.

8. The method of claim 1, wherein the modifying comprises increasing the determined signal quality metric for the one of the plurality of signal paths by a fixed amount or a predetermined amount.

9. The method of claim 1, wherein the modifying comprises dynamically changing the determined signal quality metric for the one of the plurality of signal paths.

10. The method of claim 1, wherein the modifying comprises decreasing the determined signal quality metric for the one of the plurality of signal paths by a fixed amount or a predetermined amount.

11. The method of claim 1, wherein the selecting comprises selecting a signal path with a signal quality metric greater than the modified signal quality metric.

12. The method of claim 1, wherein the selecting comprises selecting a signal path with a signal quality metric less than the modified signal quality metric.

13. A system, comprising:
   circuitry configured to:
      determine a signal quality metric for each of a plurality of signal paths, each of the plurality of signal paths corresponding to a respective one of a plurality of antennas;
      modify the determined signal quality metric for each of a subset of the plurality of signal paths; and
      select at least one of the plurality of signal paths for receiving a signal based at least in part on the determined signal quality metrics, the selecting being biased based at least in part on the modified signal quality metrics.

14. The system of claim 13, wherein the signal quality metric comprises a power level characteristic.

15. The system of claim 13, wherein the signal quality metric comprises a packet error rate characteristic.

16. The system of claim 13, wherein the signal quality metric comprises a bit error rate characteristic.

17. The system of claim 13, wherein the signal quality metric comprises a propagation channel characteristic.

18. The system of claim 13, wherein the modifying comprises increasing the determined signal quality metrics for the subset of the plurality of signal paths.

19. The system of claim 13, wherein the modifying comprises decreasing the determined signal quality metrics for the subset of the plurality of signal paths.

20. A system, comprising:
   circuitry configured to:
      determine a signal quality metric for each of a plurality of M signal paths corresponding to M antenna inputs;
      modify the determined signal quality metric for each of a subset of the plurality of M signal paths; and
      select at least one of the plurality of signal paths for receiving a signal, the selecting being biased based at least in part on the modified signal quality metrics.

* * * * *